UNITED STATES PATENT OFFICE.

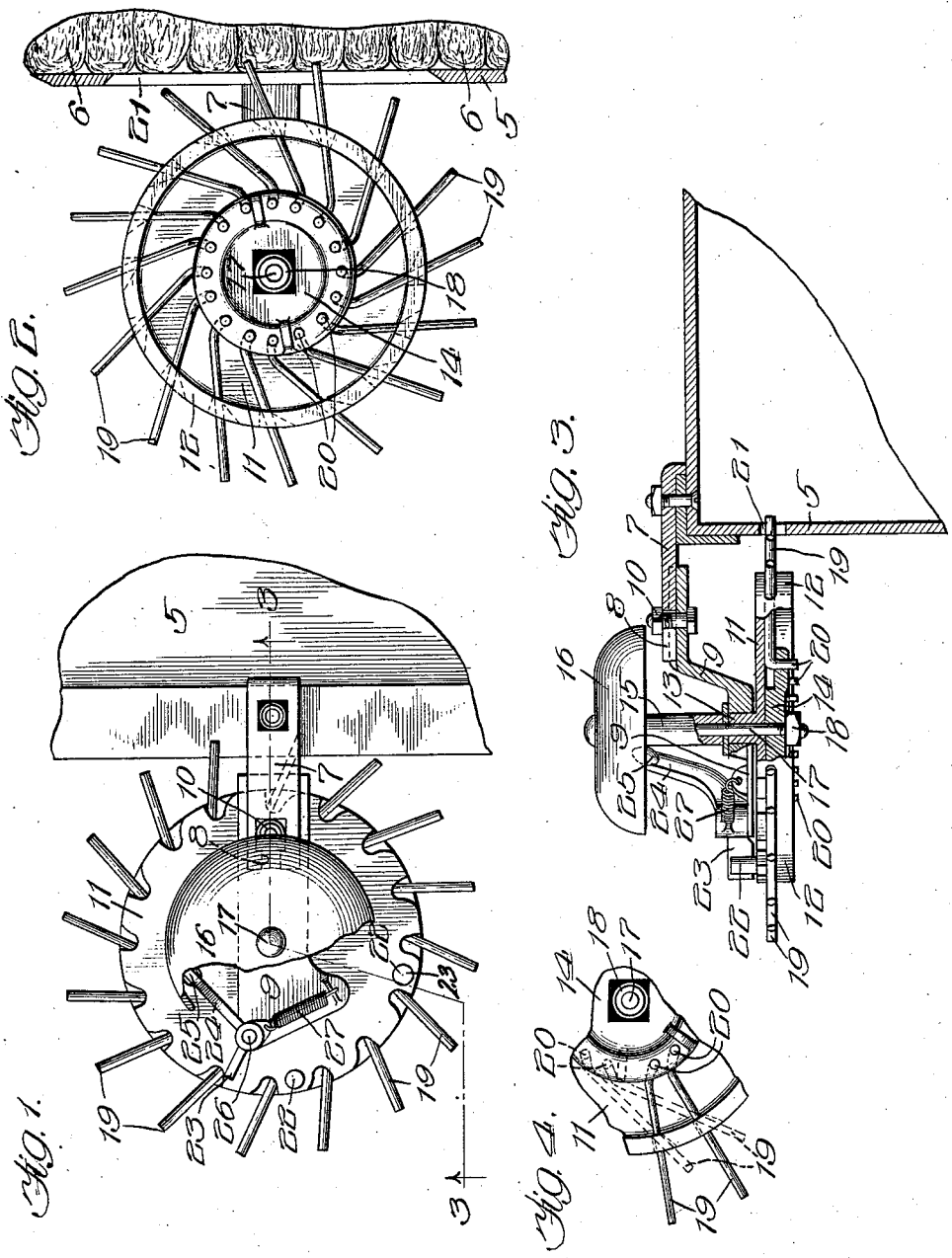

HERBERT B. SPERRY, OF OTTUMWA, IOWA, ASSIGNOR TO DAIN MANUFACTURING COMPANY OF IOWA, OF OTTUMWA, IOWA, A CORPORATION OF IOWA.

MEASURING-WHEEL FOR BALING-PRESSES.

1,028,974.

Specification of Letters Patent. Patented June 11, 1912.

Application filed July 8, 1910. Serial No. 571,025.

*To all whom it may concern:*

Be it known that I, HERBERT B. SPERRY, a citizen of the United States, residing at Ottumwa, in the county of Wapello and State of Iowa, have invented certain new and useful Improvements in Measuring-Wheels for Baling-Presses, of which the following is a specification, reference being had to the accompanying drawings.

My invention relates to measuring devices for hay presses, and has for its object to provide a new and improved measuring wheel for actuating suitable alarm mechanism which gives the operator notice automatically when the bale has reached the proper length for the dropping of the division block which forms the beginning of the next succeeding bale, thus insuring the making of the bales of uniform length and avoiding the necessity of watching the bale closely to see just when the division block should be dropped. I accomplish this object as illustrated in the drawings and as hereinafter described.

What I regard as new is set forth in the claims.

In the accompanying drawings,—Figure 1 is a plan view of a part of a hay-press showing the application thereto of alarm mechanism including my improved measuring wheel; Fig. 2 is an under-side view of the parts shown in Fig. 1, a part of the baling chamber being shown in section; Fig. 3 is a partial vertical cross-section on line 3—3 of Fig. 1; and Fig. 4 is a partial under-side view illustrating the manner in which the device is adjusted to vary the length of the bales.

In the drawings I have illustrated my invention as embodied in an alarm mechanism which comprises an alarm bell arranged to be operated by the bale being formed so as to ring the bell when a bale has reached a predetermined length, thereby notifying the operator to drop the division board.

Referring to the drawings,—5 indicates a baling chamber, and 6 charges of hay which have been compressed and carried thereinto by the action of the plunger, as usual.

7 indicates a bracket fixedly secured to the baling case 5 and projecting laterally therefrom, as shown in Fig. 3. Said bracket 7 is provided with a slot 8 in its outer end and is adapted to support a second bracket or arm 9 which is fitted thereto, the two brackets being secured together by a bolt 10 which passes through the slot 8. Thus the bracket 9 may be adjusted toward and from the baling case 5, as may be necessary.

11 indicates a wheel or disk having a depending marginal flange 12, which wheel is pivotally supported by the bracket 9 so as to rotate about a vertical axis. Said wheel is provided with a boss or hub 13 which fits in a suitable bearing in the bracket 9, as shown in Fig. 3.

14 indicates a disk concentric with the wheel 11 and mounted at the under side thereof so as to rotate therewith.

15 indicates a sleeve mounted at the upper side of the bracket 9 and forming a support for a bell 16. The bell 16, sleeve 15, wheel 11 and disk 14 are all connected together by a bolt 17 having a nut 18 at its lower end, said nut bearing against the disk 14, as shown in Fig. 3. By this construction the disk 14 may be clamped tightly against the wheel 11 so as to rotate therewith, but by loosening the nut 18 said disk 14 may be rotated independently of the wheel 11 for a purpose which will be hereinafter set forth.

19 indicates a series of spokes or fingers which project through holes in the flange 12, their inner ends being bent at right angles, as shown at 20 in Fig. 3, and fitted in suitable holes provided in the disk 14 to receive them. The fingers 19 project angularly through the flange 12, as shown in Fig. 2, and it will be apparent that by rotating the disk 14 independently of the wheel 11 the angle of the several fingers 19 with reference to the wheel 11 may be varied, thereby causing them to project a greater or less distance beyond the periphery of the flange 12. The wheel 11 is so mounted with reference to the baling case that the fingers 19 project slightly into the baling case, through any convenient opening or through a slot provided for that purpose, such as 21 shown in Fig. 2. By this construction, as the several charges of hay progress through the baling chamber they will engage the fingers 19 and cause the wheel 11 to rotate, and the speed of rotation of the wheel 11 may be varied by increasing or decreasing the effective diameter of the wheel 11, which is the diameter between the ends of opposite fingers 19, by properly adjusting the disk 14 relatively to the wheel 11. This is illustrated in Fig. 4. When the fingers 19 are adjusted to reduce the diameter of the wheel 11, obviously the wheel must be set nearer the baling case, and the slot 8 permits of this adjustment. The circumference of the wheel 11 corresponds with the length of the bale to be formed, and in order to ring the bell 16 once for each complete rotation of the wheel 11 said wheel is provided on its upper surface with a lug 22 which is adapted to engage an outwardly-projecting arm 23 which is connected with an arm 24 which carries the hammer 25 by which the bell is sounded. The arms 23 and 24 are made integral, somewhat in the form of a bell-crank lever, being pivoted at 26 upon the outer end of the bracket 9, as shown in Fig. 1. The arrangement is such that the lug 22 by its engagement with the arm 23 moves the hammer arm 24 back away from the bell, and when the lug 22 passes beyond the end of the arm 23 and thereby releases the same, the hammer 25 is thrown violently into contact with the bell by means of a spring 27 connected with the arm 24, as shown in Fig. 1. By this means the operator is warned, whenever a bale of the desired length has been formed, to drop the division board and start a new bale.

Instead of a bell, any other suitable apparatus for notifying the operator when the bale is completed may be employed, and the term "alarm" as herein used is therefore to be construed generically.

While my improved measuring wheel is illustrated as employed in connection with the alarm mechanism of a baling press, it may be employed in any other situation or for any other purpose to which it is adapted, and the claims hereinafter made are to be construed accordingly.

That which I claim as my invention, and desire to secure by Letters Patent, is,—

1. A wheel having a laterally-projecting annular flange provided with perforations at intervals, a plurality of fingers pivotally supported by said wheel and projecting through said perforations, and means for varying the angular relation of said fingers to the periphery of the wheel.

2. A wheel having a laterally-projecting annular flange provided with perforations at intervals, a rotary disk arranged adjacent to said wheel, a plurality of fingers pivotally connected with said disk and projecting through said perforations, and means for securing said disk and wheel in fixed relation to each other.

3. A wheel having a laterally-projecting annular flange provided with perforations at intervals, a disk arranged concentrically with said wheel, a bolt on which said wheel and disk are pivotally mounted, and fingers pivotally connected with said disk and projecting through said perforations.

4. A wheel having a laterally-projecting annular flange provided with perforations at intervals, a disk arranged concentrically with said wheel, a bolt on which said wheel and disk are pivotally mounted, and fingers pivotally connected with said disk and projecting through said perforations, said disk being adjustable to vary the angular relation of said fingers to said wheel.

HERBERT B. SPERRY.

Witnesses:
JOSEPH H. BROWNING,
W. G. DUFFIELD.

Copies of this patent may be obtained for five cents each, by addressing the "Commissioner of Patents, Washington, D. C."